(12) United States Patent
Osada et al.

(10) Patent No.: US 6,971,114 B2
(45) Date of Patent: *Nov. 29, 2005

(54) OPTICAL PICKUP DEVICE AND RECORDING AND/OR REPRODUCING DEVICE

(75) Inventors: Yasuo Osada, Saitama (JP); Hideo Nagasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,607

(22) Filed: Mar. 17, 2005

(65) Prior Publication Data

US 2005/0157610 A1    Jul. 21, 2005

Related U.S. Application Data

(63) Continuation of application No. 10/088,506, filed as application No. PCT/JP01/06606 on Jul. 31, 2001, now Pat. No. 6,880,163.

(30) Foreign Application Priority Data

Jul. 31, 2000    (JP)    ............... P2000-232466

(51) Int. Cl.$^7$ ............................................. G11B 7/08
(52) U.S. Cl. .................................................... 720/663
(58) Field of Search ............................. 720/663, 244, 720/71

(56) References Cited

U.S. PATENT DOCUMENTS

| 5,119,362 A | | 6/1992 | Yanagisawa |
| 5,995,467 A | * | 11/1999 | Ohyama et al. .............. 369/71 |
| 6,081,500 A | | 6/2000 | Seino |
| 6,351,444 B1 | | 2/2002 | Sogawa et al. |
| 6,366,551 B1 | | 4/2002 | Wu |
| 6,385,160 B1 | | 5/2002 | Jeon |

FOREIGN PATENT DOCUMENTS

| JP | 46967/1990 | 3/1990 |
| JP | 10-49895 | 2/1998 |
| JP | 10-143899 | 5/1998 |
| JP | 2000-057620 | 2/2000 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

This device has an optical pickup section, a first rack portion provided on the optical pickup section, a slide member having an opening/closing portion for opening/closing a facing surface of the objective lens to the optical disc and a second rack portion provided to be slidable on the first rack portion, and a driving mechanism having a driving gear which meshes with the first rack portion and the second rack portion. In this device, when the optical pickup section is moved to a predetermined position, the meshing state of the first rack portion with the driving gear is canceled and the second rack portion is driven by the driving gear to move the slide member, thereby moving the opening/closing portion from a position for opening the facing surface side of the objective lens to a position for closing the facing surface side.

1 Claim, 11 Drawing Sheets

US 6,971,114 B2

OPTICAL PICKUP DEVICE AND RECORDING AND/OR REPRODUCING DEVICE

CROSS REFERENCE TO RELATED APPLICATIONS

This application is a continuation of and claims priority under 35 U.S.C. §120 to U.S. application Ser. No. 10/088,506, filed Aug. 6, 2002, now U.S. Pat. No. 6,880,163 which is the national stage of PCT/JP01/06606, filed Jul. 31, 2001 and is also based upon and claims priority under 35 U.S.C. §119 from Japanese Patent Application No. P2000-232466, filed Jul. 31, 2000, the entire contents of which are incorporated herein by reference.

TECHNICAL FIELD

This invention relates to an optical pickup device for recording and/or reproducing information to and/or from a disc-shaped recording medium such as an optical disc or a magneto-optical disc, and a recording and/or reproducing device having this optical pickup device.

BACKGROUND ART

An optical pickup device which reproduces information from an optical disc such as a CD (compact disc) as an optical disc is known. The optical pickup device of this type has an optical pickup 111 for reproducing information from an optical disc, a moving mechanism 112 for moving the optical pickup 111 in the radial direction of the optical disc, and a chassis 113 for movably supporting the optical pickup 111 and also supporting the moving mechanism 112, as shown in FIG. 1.

The optical pickup 111 is provided movably in the directions of arrows b1 and b2 in FIG. 1, in an aperture 116 for movement provided in the chassis 113, as shown in FIG. 1. The optical pickup 111 has an optical system (not shown) having an objective lens 118, a driving portion (not shown) for driving and displacing the objective lens 118 in the direction of the optical axis of the objective lens 118 and in the direction orthogonal to the optical axis, and a cover member 120 for covering the driving portion.

The optical pickup 111 has a light source such as a laser diode for emitting a laser beam, a group of lenses constituting the optical system, and a light receiving section for receiving a reflected light from the optical disc, though not shown in the drawing. The driving section provided in the optical pickup 111 has a lens holder for holding the objective lens 118, a supporting mechanism for supporting the lens holder displaceably in the direction of the optical axis of the objective lens 118 and in the direction orthogonal to the optical axis, and an electromagnetic circuit section for driving the lens holder by an electromagnetic force. The cover member 120 is made of, for example, a resin material formed in a substantially box-like shape, and has a substantially elliptic aperture 121 provided therein for exposing the objective lens 118 to the optical disc, as shown in FIG. 1.

The moving mechanism 112 has a supporting base 123 for supporting the optical pickup 111, a supporting shaft 124 for supporting the supporting base 123 movably in the radial direction of the optical disc, a guide portion 125 for movably guiding the supporting base 123, a slide member 126 for moving the supporting base 123, a compression coil spring 127 for energizing the slide member 126 in the axial direction of the supporting shaft 124 with respect to the supporting base 123, a driving gear 128 for driving the slide member 126, and a driving motor (not shown) for rotationally driving the driving gear 128, as shown in FIG. 1.

The optical pickup 111 is arranged on the major surface of the supporting base 123, and the supporting base 123 has bearing portions 131, 131 through which the supporting shaft 124 is movably inserted and a guide recess portion 132 which is movably engaged with the guide portion 125, as shown in FIGS. 1 and 2. At one end of the supporting base 123, a rack portion 133 which is meshed and moved with the driving gear 128 is integrally formed.

This rack portion 133 is formed parallel to the axial direction of the supporting shaft 124, as shown in FIG. 1. The rack portion 133 has engagement pawls 135, 135 which are engaged with the slide member 126, and a retaining piece 136 for retaining one end of the compression coil spring 127.

As shown in FIG. 1, the axial direction of the supporting shaft 124 is arranged parallel to the radial direction of the optical disc, across the aperture 116 for movement of the chassis 113, and both ends of the supporting shaft 124 are fixed on the chassis 113 by fixing portions, not shown.

The guide portion 125 is linearly formed by using a resin material and is formed parallel to the axial direction of the supporting shaft 124 along one lateral edge of the aperture 116 for movement of the chassis 113, as shown in FIG. 1. With this guide portion 125, the guide recess portion 132 of the supporting base 123 is movably engaged, as shown in FIG. 2.

The slide member 126 has a rack portion 138 formed parallel to the axial direction of the supporting shaft 124, and this rack portion 138 is shifted by approximately a half cog thickness from he rack portion 133 of the supporting case 123, as shown in FIG. 3. In the slide member 126, engagement holes 140, 140 are formed which are engaged with the engagement pawls 135, 135 of the rack portion 133 of the supporting base 123, as shown in FIG. 1. Moreover, an aperture 141 in which the compression coil spring 127 is arranged is provided substantially at the center of the major surface of the slide member 126, and a retaining piece 142 for retaining the other end of the compression coil spring 127 is formed at one end of the aperture 141.

As shown in FIG. 1, one end of the compression coil spring 127 is retained by the retaining piece 136 of the rack portion 133 of the supporting base 123, and the other end of the compression coil spring 127 is retained by the retaining piece 142 of the slide member 126. Therefore, the compression coil spring 127 energizes, by its elastic force, the slide member 126 in the direction of an arrow b3 parallel to the axial direction of the supporting shaft 124 with respect to the rack portion 133 of the supporting base 123.

In the optical pickup device, in order to prevent attachment of dust and particles to the facing surface of objective lens 118 of the optical pickup 111 which faces the optical disc due to an air current within the device in the reproduction standby state or the like, an opening/closing mechanism 145 is provided which has an opening/closing member 146 provided movably between a closing position for covering the facing surface of the objective lens 118 and an opening position for opening and exposing the facing surface of the objective lens 118 to the optical disc, as shown in FIG. 1.

The opening/closing mechanism 145 has the opening member 146 for opening/closing the facing surface of the objective lens 118, a rotary shaft 147 for rotatably supporting the opening/closing member 146, and a tension coil spring 148 for energizing the opening/closing member 146 to the closing position, as shown in FIGS. 1 and 4.

As shown in FIG. 1, the opening/closing member 146 has an opening/closing portion 151 for opening/closing the aperture 121 of the cover member 120 of the optical pickup 111, a bearing portion 152 for rotatably supporting the rotary shaft 147, a guide portion 153 slidably engaged with the cover member 120 for guiding the opening/closing portion 151, and an operating portion 154 for rotating the opening/closing portion 151 in the directions of arrows c1 and c2 in FIG. 1.

The opening/closing portion 151 is formed in a substantially flat plate-like shape and slides on the upper surface of the cover member 120, thus opening/closing the aperture 121 of the cover member 120. \ The bearing portion 152 is integrally formed at one end of the opening/closing portion 151 and has a shaft hole in which the rotary shaft 147 is rotatably inserted. The guide portion 153 is formed to have a cross section of a substantially U-shape fallen sideways, and is slidably engaged with a substantially arc-shaped guide piece 155 which is integrally formed to protrude on the outer circumferential portion of the cover member 120. The operating portion 154 is formed at a position where it is exposed to an operating protrusion 156 provided on the chassis 113, on the outer circumferential portion of the bearing portion 152, as shown in FIG. 1. When the optical pickup 111 is moved to the innermost part of the recording area of the optical disc, the operating portion 154 is abutted against the operating protrusion 156 and rotates the bearing portion 152 in the direction of rotation of the rotary shaft 147.

The rotary shaft 147 is provided upright on the supporting base 123 and is rotatably inserted in the shaft hole of the bearing portion 152 of the opening/closing member 146. The tension coil spring 148 has its one end retained by a retaining piece 158 provided on the supporting base 123 and has its other end retained by a retaining piece 159 situated near the bearing portion 152 of the opening/closing member 146, as shown in FIG. 1. The tension coil spring 148 energizes the rack portion 133 of the supporting base 123 and the rack portion 138 of the slide member 126 in the direction for offsetting the backlash with respect to the driving gear 128, and is precisely moved to the supporting base 123 and the slide member 126 by the driving gear 128. That is, in the optical pickup device, since the rack portion 133 of the supporting base 123 and the rack portion 138 of the slide member 126 are energized by the compression coil spring 127 and thus meshed with the driving gear 128, the optical pickup 111 can be moved with high precision.

On the chassis 113, a disc rotational driving mechanism for rotationally driving the optical disc is provided. The disc rotational driving mechanism has a disc table 160 on which the optical disc is set, and a spindle motor (not shown) for rotationally driving the disc table 160, as shown in FIG. 4.

In the optical pickup device constituted as described above, when reproducing information from the optical disc, the supporting base 123 is moved along the supporting shaft 124 and the guide portion 125 by the moving mechanism 112, and the optical pickup 111 is moved in the radial direction of the optical disc.

In the optical pickup device, as shown in FIG. 5, when the optical pickup 111 is moved in the radial direction of the optical disc to the innermost part of the recording area of the optical disc, the operating portion 154 of the opening/closing member 146 is abutted against the operating portion 156 on the chassis 113 and the optical pickup 111 is moved further by a predetermined quantity, thus rotating the opening/closing member 146 in the direction of an arrow c2 against the energizing force of the tension coil spring 148. In the optical pickup device, when the optical pickup 111 is moved to the innermost circle of the optical disc, the opening/closing member 146 is rotated to the closing position to close the aperture 121 of the cover member 120, thus preventing attachment of dust and particles to the facing surface of the objective lens 118, as shown in FIG. 5.

In the optical pickup device, when the optical pickup 111 is moved into a TOC (table of contents) area on the inner side of the recording area, the opening/closing member 146 is rotated to the opening position and the facing surface of the objective lens 118 of the optical pickup 111 is exposed to the optical disc, thus enabling reproduction of information from the optical disc. The optical pickup 111 reproduces information from the optical disc while the opening/closing member 146 is situated to the opening position, as shown in FIG. 4.

Since the opening/closing mechanism 145 for causing the opening/closing member 146 to carry out the opening/closing operation has the rotary shaft 147 and the tension coil spring 148, the above-described conventional optical pickup device has problems that the manufacturing cost is high, that the assembly work is troublesome, and that assembly failure tends to occur.

In the conventional optical pickup device, since the opening/closing member 146 is rotatably provided via the rotary shaft 147, the lever ratio is related to the quantity of rotation near the bearing portion 152 and the quantity of rotation of the opening/closing portion 151.

In the conventional optical pickup device, since the ratio of the quantity of movement of the optical pickup 111 moved when rotating the opening/closing member 146 to the quantity of rotation of the opening/closing member 146 is large, it is difficult to control the opening/closing operation of the opening/closing member 146 in accordance with the movement of the optical pickup 111 by a control circuit or the like.

Therefore, the conventional optical pickup device has a problem that the irregularity of the rotating position of the opening/closing member 146 prevents complete closure of the aperture 121 of the cover member 120. To restrain the irregularity of the opening/closing operation of the opening/closing member 146, the opening/closing mechanism 145 must increase the precision of each of its component parts and therefore the manufacturing cost must be increased.

In the conventional optical pickup device, the unevenness in the assembly precision or the like of the opening/closing mechanism 145 causes slight unevenness in the slide resistance between the guide portion 153 of the opening/closing member 146 and the guide piece 155 of the cover member 120. Since the slide resistance is amplified by the lever ratio, the opening/closing member 146 cannot carry out the opening/closing operation.

DISCLOSURE OF THE INVENTION

Thus, it is an object of the present invention to provide an optical pickup device which enables improvement in the reliability of the opening/closing operation of the opening/closing member for preventing attachment of dust and particles to the objective lens of the optical pickup, realization of simplification of the overall structure and reduction in manufacturing cost, and recording and/or reproducing device having this optical pickup device.

A recording and/or reproducing device according to the present invention is a device using an optical disc as a recording medium. The device comprises: an optical pickup having an objective lens and provided to be movable in the radial direction of an optical disc; a first rack portion provided on the optical pickup; a slide member having an opening/closing portion for opening/closing a facing surface of the objective lens to the optical disc, and a second rack portion provided to be slidable on the first rack portion; and a driving mechanism having a driving gear which meshes with the first rack portion and the second rack portion. In this device, when the first and second rack portions are driven by the driving gear and the optical pickup is thus moved to a predetermined position, the meshing state of the first rack portion with the driving gear is canceled and the second rack portion is driven by the driving gear to move the slide member, thereby moving the opening/closing portion from a position for opening the facing surface side of the objective lens to a position for closing the facing surface side.

This device further comprises a detecting section for detecting that the optical pickup has reached a predetermined position on the inner circle side of the optical disc. The detecting section is operated by the optical pickup when the optical pickup reaches at least a position in a table-of-contents area of the optical disc.

The device according to the present invention further comprises a control section for driving a driving motor for a predetermined time period on the basis of a detection output from the detecting section. As the driving motor is driven for a predetermined time period, the optical pickup is moved further toward the inner circle side of the optical disc.

In the recording and/or reproducing device according to the present invention, when the first and second rack portions are driven by the driving gear and the optical pickup is thus moved to a predetermined position, the meshing state of the first rack portion with the driving gear is canceled and the second rack portion is driven by the driving gear to move the slide member, thereby moving the opening/closing portion from a position for opening the facing surface side of the objective lens to a position for closing the facing surface side and causing the opening/closing portion to close the facing surface side in a standby state.

An optical pickup device according to the present invention comprises: an optical pickup section having an objective lens and provided to be movable along a guide portion; a first rack portion provided on the optical pickup section; a slide member having an opening/closing portion for opening/closing a facing surface of the objective lens to an optical disc, and a second rack portion provided to be slidable on the first rack portion; and a driving mechanism having a driving gear which meshes with the first rack portion and the second rack portion. In, this optical pickup device, when the first and second rack portions are driven by the driving gear and the optical pickup section is thus moved to a predetermined position, the meshing state of the first rack portion with the driving gear is canceled and the second rack portion is driven by the driving gear to move the slide member, thereby moving the opening/closing portion from a position for opening the facing surface side of the objective lens to a position for closing the facing surface side.

In this optical pickup device, at least one protrusion is provided on the slide member, and an abutment portion to be abutted against the protrusion is provided on the optical pickup section. As the second rack portion is moved in a direction such that the opening/closing portion opens the facing surface side so as to abut the protrusion against the abutment portion, the first rack portion is meshed with the driving gear.

The optical pickup device further comprises an elastic member tensioned between the first rack portion and the second rack portion.

The optical pickup section further has a cover which has an aperture formed therein at a position facing the objective lens and which is adapted for at least covering the objective lens. The opening/closing portion moves on the cover between the position for opening the facing surface and the position for closing the facing surface, thus opening/closing the aperture.

The optical pickup device further has a guide portion for guiding the movement of the optical pickup section in the radial direction of the optical disc. The guide portion has a supporting shaft for guiding the optical pickup section, a reference portion abutted at least at two positions of an outer circumferential portion of the supporting shaft for positioning the supporting shaft, an engagement portion engaged with the outer circumferential portion of the supporting shaft, and an elastic displacement portion formed integrally with the engagement portion for energizing the engagement portion in the radial direction of the supporting shaft. The elastic displacement portion is bent from a direction substantially parallel to the axial direction of the supporting shaft to a direction substantially orthogonal to the axial direction of the supporting shaft, thereby energizing the engagement portion in the radial direction of the supporting shaft.

The other objects and advantages of the present invention will be clarified further from the specific description of the embodiment with reference to the drawings.

BEST MODE FOR CARRYING OUT THE INVENTION

An optical pickup device to which the present invention is applied and a disc drive device using this optical pickup device will now be described with reference to the drawings.

Figure 1:
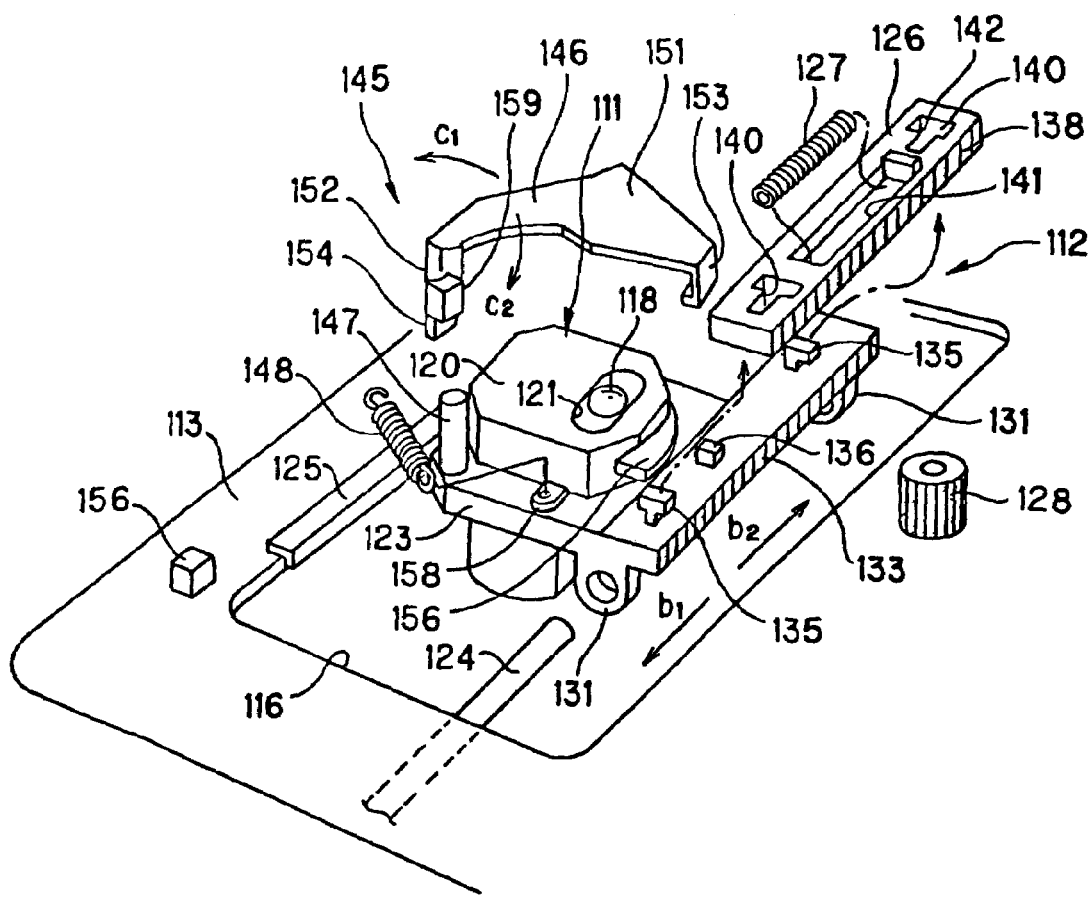
FIG. 1 is an exploded perspective view for explaining a conventional optical pickup device.
Figure 2:
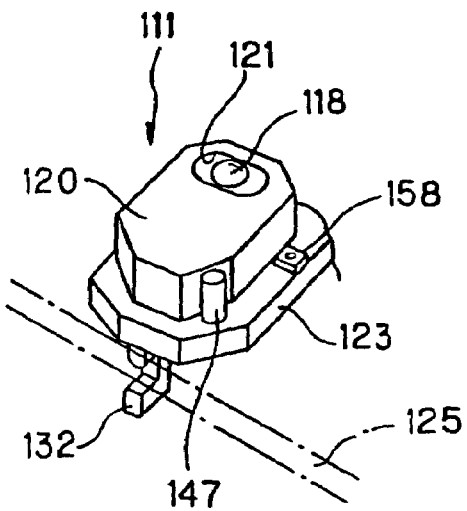
FIG. 2 is a perspective view for explaining a supporting base provided in the conventional optical pickup device.
Figure 3:
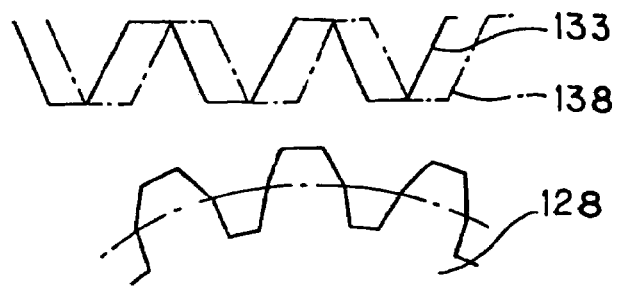
FIG. 3 is a plan view for explaining a rack portion of the supporting base and a rack portion of a slide member provided in the conventional optical pickup device.
Figure 4:
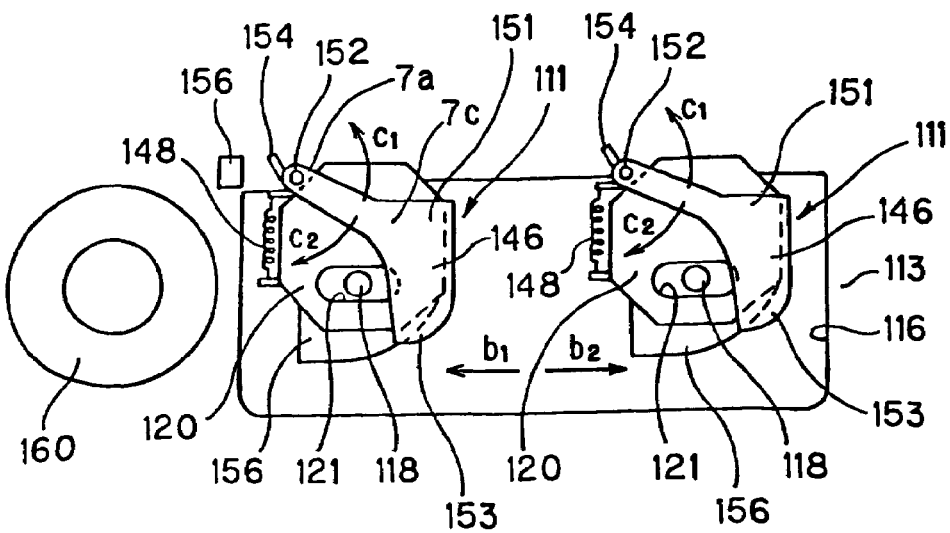
FIG. 4 is a plan view for explaining the state in which an opening/closing member of an opening/closing mechanism provided in the conventional optical pickup mechanism is opened.
Figure 5:
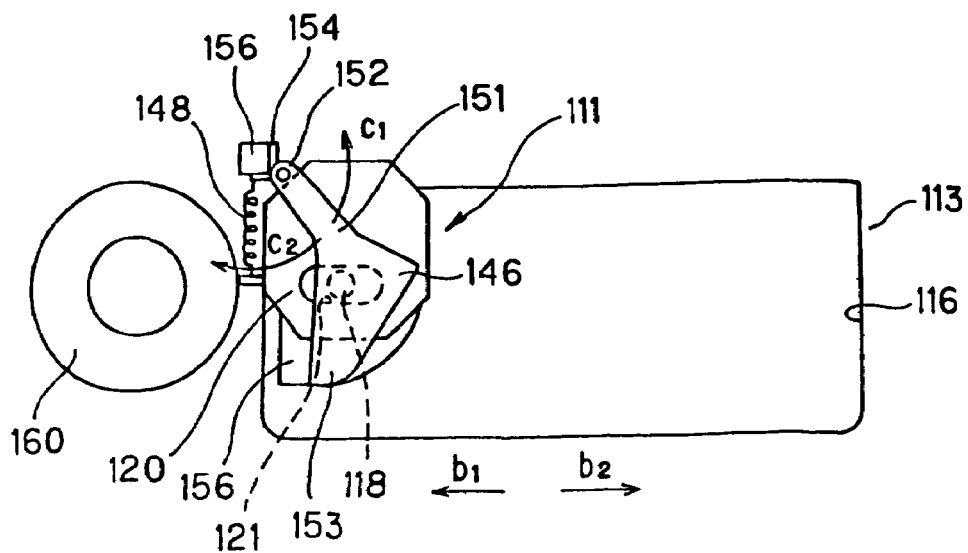
FIG. 5 is a plan view for explaining the state in which the opening/closing member of the opening/closing mechanism is closed.
Figure 6:
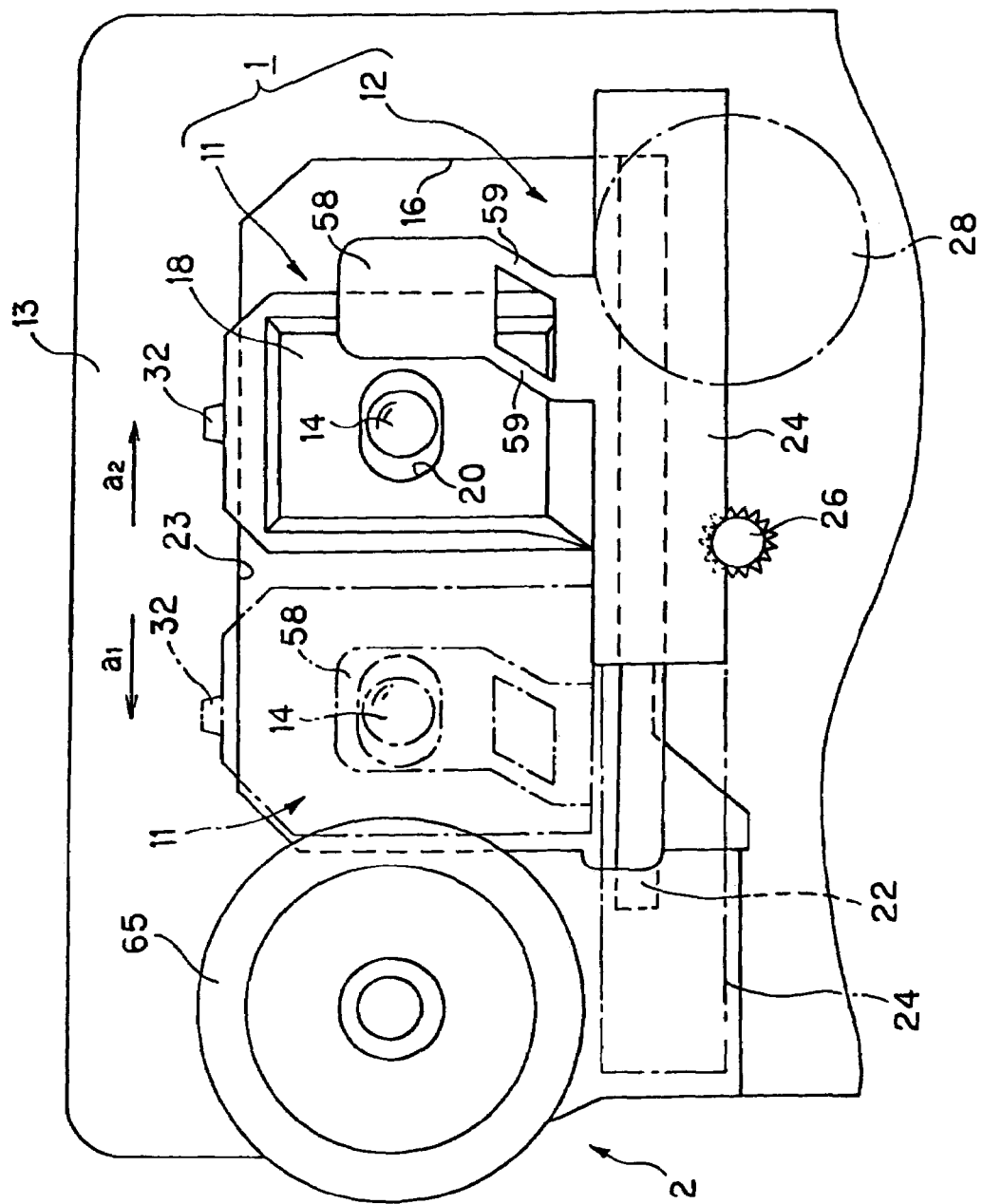
FIG. 6 is a plan view showing essential parts of a disc drive device in which an optical pickup device according to the present invention is provided.

The disc drive device using the optical pickup device according to the present invention has an optical pickup device 1 for recording or reproducing information to or from an optical disc, and a disc driving mechanism 2 for rotationally driving an optical disc, as shown in FIG. 6.

An optical disc loaded on the disc drive device according to the present invention may be exemplified by a CD (compact disc) on which information is recorded. On the inner circle side and the outer circle side of the recording area of the optical disc in which information is recorded, a lead-in area and a lead-out area are provided, respectively. In the lead-in area, a TOC (table of contents) area is provided in which, for example, the index and physical address of the recorded information are recorded.

The optical pickup device 1 according to the present invention has an optical pickup section 11 having an objective lens 14, a moving mechanism 12 for moving the optical pickup section 11 in the directions of arrows a1 and a2 parallel to the radial direction of the optical disc, and a chassis 13 for movably supporting the optical pickup section 11 and also supporting the moving mechanism 12, as shown in FIG. 6.

Figure 7:
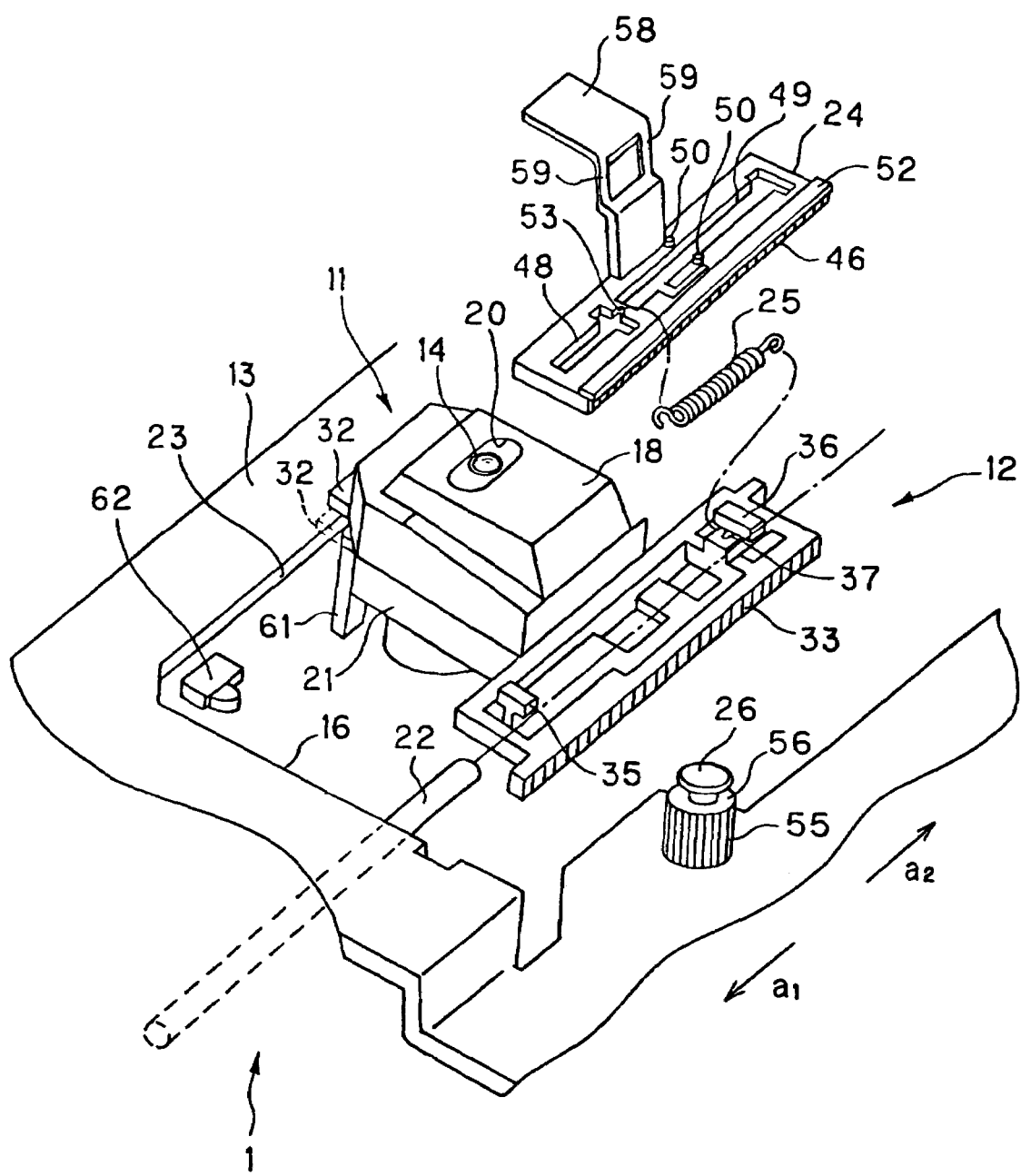
FIG. 7 is an exploded perspective view showing an optical pickup device.

The optical pickup section 11 is movably provided in an aperture 16 for movement provided in the chassis 13, as shown in FIGS. 6 and 7. The optical pickup section 11 has an optical system having the objective lens 14, an electromagnetic driving section (not shown) for driving and displacing the objective lens 14 in the focusing direction parallel to the optical axis of the objective lens and in the tracking direction orthogonal to the optical axis, and a cover member 18 for covering the electromagnetic driving section.

The electromagnetic driving section has a lens holder for holding the objective lens 14, a supporting mechanism for supporting the lens holder displaceably in the focusing direction and the tracking direction, and an electromagnetic circuit section for driving and displacing the objective lens 14 by an electromagnetic force, though not shown.

In the optical pickup section 11, the optical system has a laser diode as a light source for emitting a laser beam, a group of lenses constituting the optical system, and a light receiving section for receiving a reflected light from the optical disc, though not shown. The laser beam emitted from the laser diode is converged by the objective lens 14 and thus cast onto the recording layer of the optical disc. The laser beam is reflected by the recording layer of the optical disc, becomes incident on the optical pickup section 11 via the objective lens 14, and is received by the light receiving section.

The cover member 18 is made of, for example, an ABS resin or the like, and is formed in a substantially box-like shape having an upper surface substantially parallel to the recording surface of the optical disc. As shown in FIGS. 6 and 7, an aperture 20 for exposing the objective lens 14 to the recording surface of the optical disc is provided substantially at the center of the upper surface of the cover member 18. This aperture 20 is formed in a substantially elliptic shape having a longer side in the radial direction of the optical disc.

The moving mechanism 12 has a supporting base 21 for supporting the optical pickup device, a supporting shaft 22 for supporting the supporting base 21 movably in the radial direction of the optical disc, a guide portion 23 for movably guiding the supporting base 21, a slide member 24 for moving the supporting base 21, a tension coil spring 25 for energizing the slide member 24 in the axial direction of the supporting shaft 22 with respect to the supporting base 21, a driving gear 26 for driving the slide member 24, a group of gears (not shown) for rotationally driving the driving gear 26, and a driving motor 28 for rotationally driving the driving gear 26 via the group of gears, as shown in FIG. 7.

The optical pickup device 1 according to the present invention has a shaft fixing mechanism 80 for positioning the supporting shaft 22 to the chassis 13.

Figure 8:
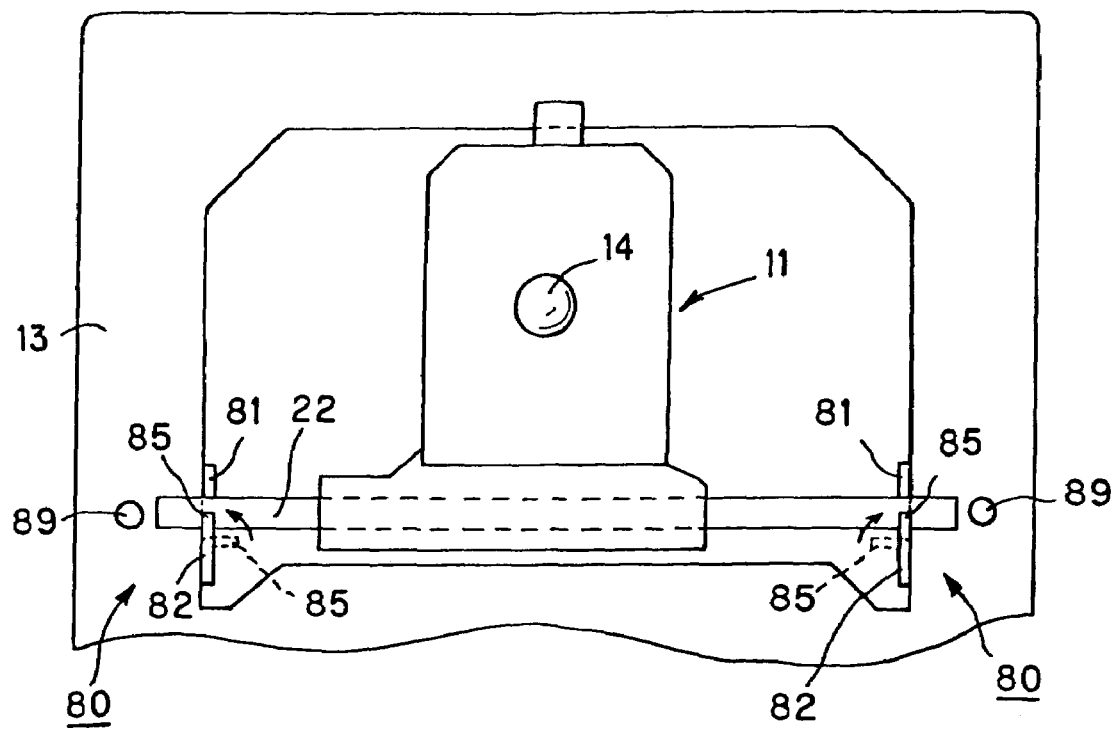
FIG. 8 is a plan view showing an optical pickup device using a shaft fixing mechanism according to the present invention.
Figure 9:
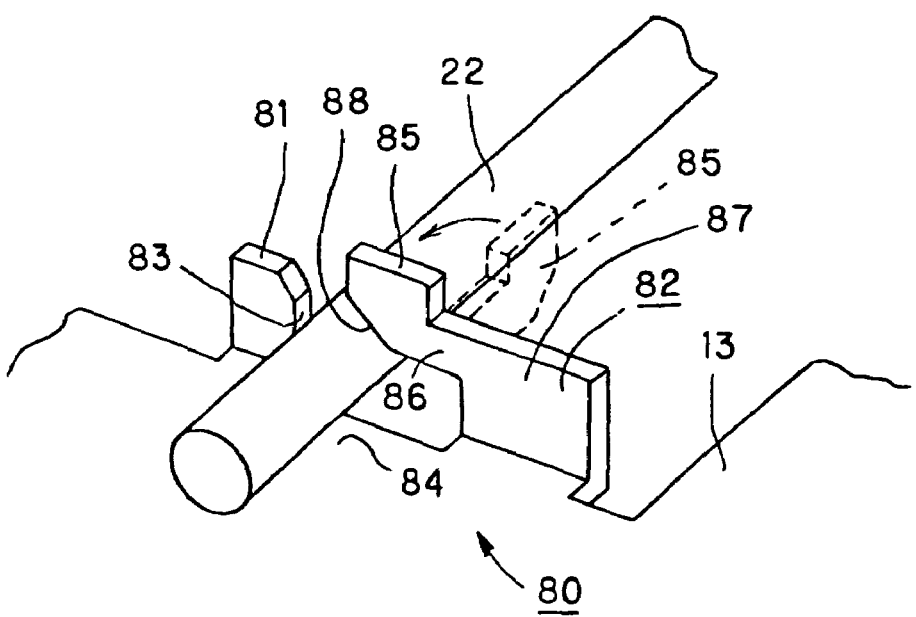
FIG. 9 is a perspective view showing the shaft fixing mechanism.

The shaft fixing mechanism 80 is provided on both ends of the supporting shaft 22, and includes the supporting shaft 22, the chassis 13, a positioning piece 81 for positioning the supporting shaft 22 to the chassis 13, and a fixing piece 82 for fixing the supporting shaft 22 to the chassis 13, as shown in FIGS. 8 and 9. The supporting shaft 22 and the chassis 13 are made of a metal material.

The positioning piece 81 is formed integrally with the chassis 13 by cutting and raising a part of the chassis 13 to be substantially orthogonal to the major surface of the chassis, as shown in FIG. 9. The fixing piece 82 has an engagement portion 85 engaged with an outer circumferential portion of the supporting shaft 22, an elastic displacement portion 86 for energizing the engagement portion 85 to press in the radial direction of the supporting shaft 22, and a proximal end portion 87 integrally formed with the chassis 13.

The engagement portion 85 is formed with a size which allows easy bending with respect to the proximal end portion 87. The elastic displacement portion 86 is formed with a narrower width than those of the engagement portion 85 and the proximal end portion 87, thus securing predetermined elasticity, as shown in FIG. 9.

On the major surface of the chassis 13, regulating protrusions 89, 89 which are abutted against both ends of the supporting shaft 22 so as to regulate the displacement of the supporting shaft 22 in the axial direction are integrally provided at both ends of the supporting shaft 22, as shown in FIG. 8.

Figure 11:
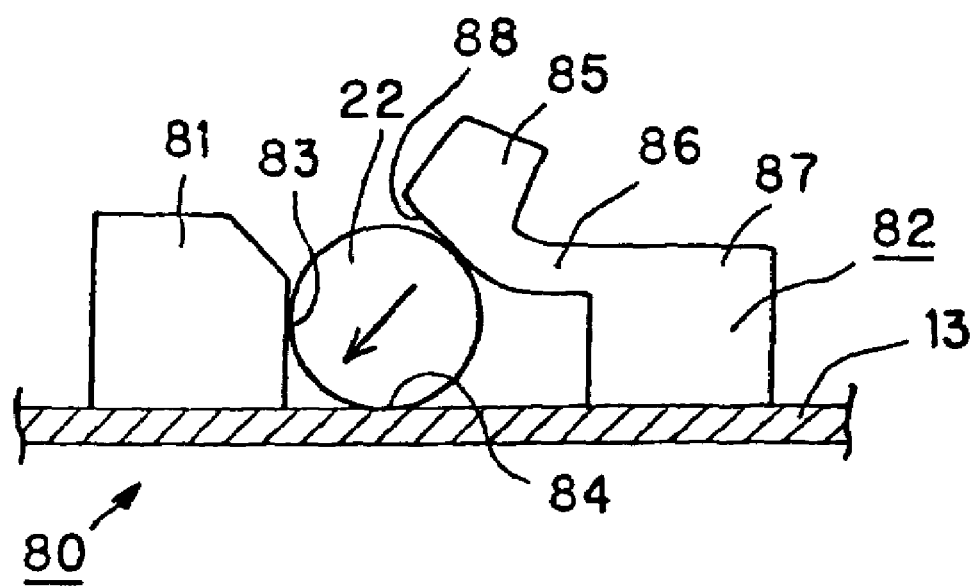
FIG. 11 is a side view showing the state in which the engagement portion of the fixing piece is engaged with a supporting shaft.

In the fixing piece 82, as the elastic displacement portion 86 is bent in advance by pressing, the engagement portion 85 is made orthogonal to the proximal end portion 87 and is thus made substantially parallel to the axial direction of the supporting shaft 22, as shown in FIGS. 8 and 9. When the engagement portion 85 is made substantially parallel to the proximal end portion 87 by bending the elastic displacement portion 86 and is thus made substantially orthogonal to the axial direction of the supporting shaft 22, a slope 88 is engaged with the outer circumferential portion of the supporting shaft 22, as shown in FIG. 11.

A shaft fixing method for positioning and fixing the supporting shaft 22 to the chassis 13 by using the shaft fixing mechanism 80 constituted as described above will now be described with reference to the drawings.

The supporting shaft 22 has its outer circumferential portion abutted against a reference surface 83 of the positioning piece 81 and a reference surface 84 of the chassis 13, and is thus positioned with respect to the chassis 13.

The engagement portion 85 of the fixing piece 82, bent in the direction substantially orthogonal to the proximal end portion 87, rides over the outer circumferential portion of the supporting shaft 22, and the slope 88 of the engagement portion 85 slides on the outer circumferential portion of the supporting shaft 22. Thus, the engagement portion 85 is made substantially parallel to the proximal end portion 87 and the elastic displacement portion 86 is partly bent to make the engagement portion 85 substantially orthogonal to the axial direction of the supporting shaft 22.

When the engagement portion 85 of the fixing piece 82 is bent to be substantially orthogonal to the axial direction of the supporting shaft 22, the engagement portion 85 is engaged with the outer circumferential portion of the supporting shaft 22 and the engagement portion 85 is energized to be pressed in the radial direction of the supporting shaft 22 by the elastic force of the elastic displacement portion 86.

Figure 10:
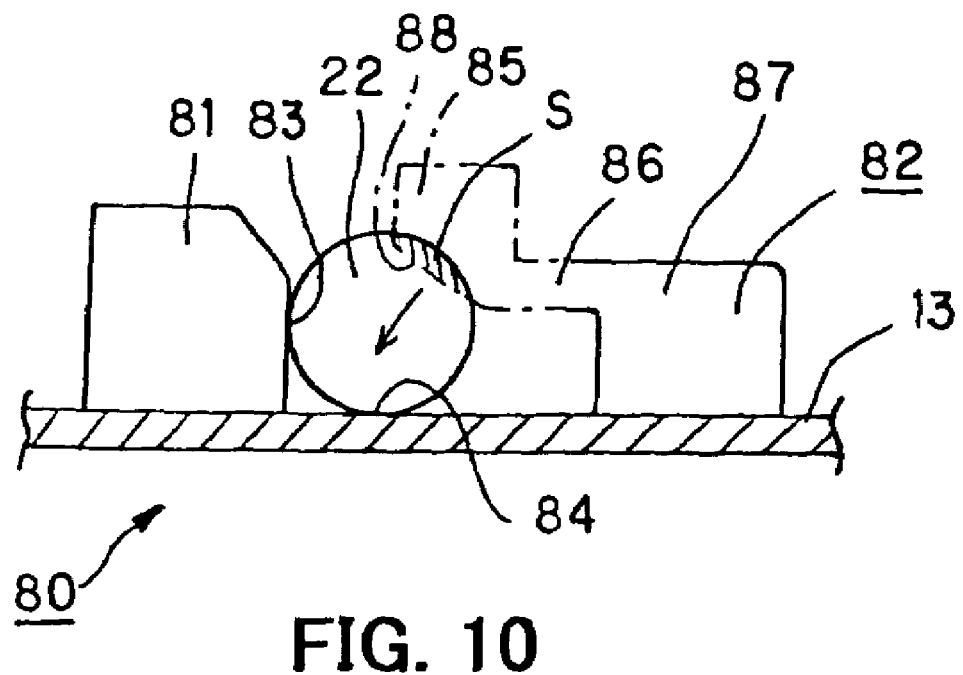
FIG. 10 is a side view showing an engagement portion of a fixing piece of the shaft fixing mechanism.

Specifically, as shown in FIG. 10, since the engagement portion 85 has an area S which overlaps the cross section of the supporting shaft 22 when the engagement portion 85 is substantially parallel to the proximal end portion 87, the elastic displacement portion 86 is elastically displaced with respect to the outer circumferential portion of the supporting shaft 22 in accordance with the area S. Therefore, the engagement portion 85 presses and securely fixes the supporting shaft 22 by a predetermined pressing force in the radial direction of the supporting shaft 22 due to the elastic force of the elastic displacement portion 86 which is elastically displaced.

In the shaft fixing mechanism 80 as described above, since the engagement portion 85 of the fixing piece 82 is formed integrally with the chassis 13, no looseness due to any vibration or shock is generated in the engagement portion 85 for fixing the supporting shaft 22 and the supporting shaft 22 can be securely fixed.

In the shaft fixing mechanism 80, since the fixing piece 82 is formed integrally with the chassis 13, the number of components and the manufacturing cost can be reduced.

Figure 12:
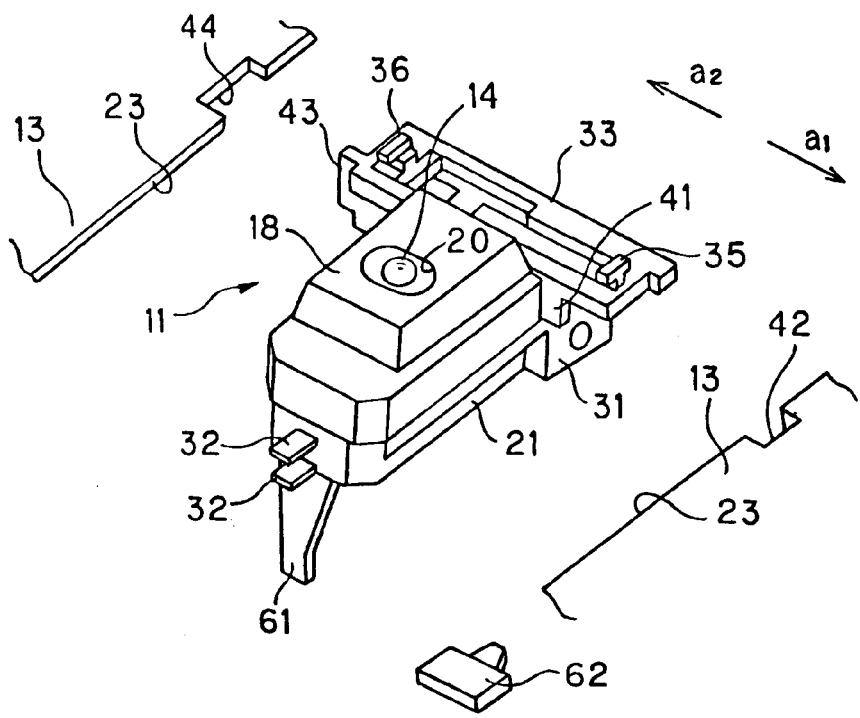
FIG. 12 is a perspective view for explaining an optical pickup device.

The supporting base 21 has the optical pickup section 11 arranged on its major surface, and has a bearing portion 31 in which the supporting shaft 22 is movably inserted, and a pair of guide pieces 32, 32 movably engaged with the guide portion 23, as shown in FIG. 12. At one lateral edge of the supporting base 21, a rack portion 33 is integrally formed which is meshed with and moved by the driving gear 26, as shown in FIG. 7.

Figure 13:
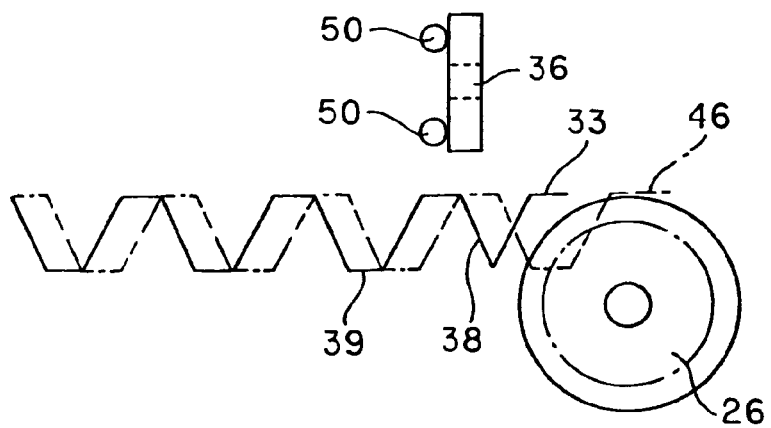
FIG. 13 is a plan view for explaining a rack portion of a supporting base and a rack portion of a slide member provided in the optical pickup device.
Figure 14:
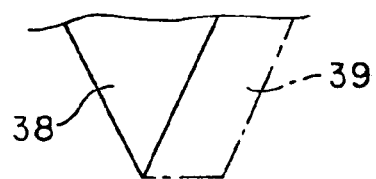
FIG. 14 is a plan view for explaining one cog of the rack portion of the supporting base.

The rack portion 33 is formed parallel to the axial direction of the supporting shaft 22, as shown in FIG. 7. On the rack portion 33, engagement pawls 35, 36 movably engaged with the slide member 24 and a retaining piece 37 for retaining one end of the tension coil spring 25 are integrally formed. In the rack portion 33, a cog 38 at the terminal end on the outer circumferential side of the optical disc is formed in a substantially triangular shape with a half thickness of the other cogs 39, as shown in FIGS. 13 and 14, and therefore is easily detached from the driving gear 26 to cancel the meshing state of the rack portion 31 with the supporting base 21.

On the supporting base 21, at a position corresponding to the inner circle side of the optical disc, a inner-side stopper piece 41 for regulating the movement of the supporting base 21 in the direction of the arrow a1 is integrally formed to protrude parallel to the direction of the movement of the supporting base 21, as shown in FIG. 12. On the chassis 13, at one lateral edge on the inner circle side of the aperture 16 for movement, a regulating recess portion 42 is cut out and formed to which the inner-side stopper piece 41 of the supporting base 21 is abutted.

On the supporting base 21, at a position corresponding to the outer circle side of the optical disc, an outer-side stopper piece 43 for regulating the movement of the supporting base 21 in the direction of the arrow a2 is integrally formed to protrude parallel to the direction of the movement of the supporting base 21, as shown in FIG. 12. On chassis 13, at one lateral edge on the outer circle side of the aperture 16 for movement, a regulating recess portion 44 is cut out and formed to which the outer-side stopper piece 43 of the supporting base 21 is abutted.

As shown in FIGS. 6 and 7, the supporting shaft 22 has its both ends fixed on the chassis 13 by fixing portions (not shown), with its axial direction arranged parallel to the radial direction of the optical disc over the movement aperture 16 of the chassis 13.

The guide portion 23 is formed parallel to the axial direction of the supporting shaft 22 along one lateral edge of the movement aperture 16 of the chassis 13, as shown in FIGS. 7 and 12. The guide pieces 32, 32 of the supporting base 21 stand face to face from above and below the guide portion 23 and the supporting base 21 movably engaged with guide portion 23, thus regulating the movement of the supporting base 21 in the direction of axial rotation of the supporting shaft 22.

The slide member 24 has a rack portion 46 formed parallel to the axial direction of the supporting shaft 22, as shown in FIG. 7. The slide member 24 is mounted on the supporting base 21 so that the rack portion 46 is coincident with the rack portion 33 of the supporting base 21. On the slide member 24, engagement grooves 48, 49 are formed which are engaged with the engagement pawls 35, 36 of the rack portion 33 of the supporting base 21 in such a manner as to enable movement parallel to the axial direction of the supporting shaft 22.

On the slide member 24, regulating pins 50, 50 for regulating the relative position to the rack portion 33 are integrally formed to protrude, as shown in FIGS. 7 and 13. As the regulating pins 50, 50 are abutted against the one engagement pawl 36 of the engagement pawls 35, 36 provided on the rack portion 33 of the supporting base 21, the relative position of the slide member 24 to the rack portion 33 is regulated.

On the slide member 24, a guide piece 52 movably engaged with the driving gear 26 is integrally formed to protrude along the rack portion 46. On the slide member 24, a retaining piece 53 for retaining the tension coil spring 25 is integrally formed.

The tension coil spring 25 has its one end retained by the retaining piece 37 of the rack portion 33 of the supporting base 21, and has its other end retained by the retaining piece 53 of the slide member 24, as shown in FIG. 7. Therefore, the tension coil spring 25 energizes, by its elastic force, the slide member 24 in the direction of the arrow a2 parallel to the axial direction of the supporting shaft 22 with respect to the rack portion 33 of the supporting base 21.

The driving gear 26 has a gear portion 55 meshed with the rack portion 33 of the supporting base 21 and the rack portion 46 of the slide member 24, as shown in FIG. 7. At the distal end of the driving gear 26, a guide groove 56 is formed with which the guide piece 52 of the slide member 24 is movably engaged, as shown in FIG. 7. The driving gear 26, and the group of gears, not shown, are provided on the chassis 13 so as to be rotatable via the supporting shaft 22. The driving motor 28 is provided on the chassis 13. The driving force from the driving motor 28 is transferred to the driving gear 26 via the group of gears, not shown.

The moving mechanism 12 has an opening/closing plate 58 which is enabled to move between a closing position for covering a facing surface, which faces the optical disc, of the objective lens 14 of the optical pickup section 11, and an opening position for opening the facing surface of the objective lens 14 so as to expose it to the optical disc, as shown in FIGS. 6 and 7.

The opening/closing plate 58 is formed integrally with the slide member 24 by using a resin material such as POM (polyoxymethylene) or the like, as shown in FIG. 7. The opening/closing plate 58 is formed in a substantially rectangular shape having an area large enough to close the aperture 20 of the cover member 18. The opening/closing plate 58 is formed to protrude from the slide member 24 via a pair of elastic linear connection pieces 59, 59, and is energized toward the upper surface of the cover member 18 by the elastic force of the connection pieces 59, 59, as shown in FIG. 7.

The moving mechanism 12 has a detection mechanism 60 for detecting that the optical pickup section 11 is moved into the TOC area of the optical disc or the inner circle side of the TOC area, as shown in FIGS. 7 and 12. The detection mechanism 60 is constituted by a detection piece 61 provided on the supporting base 21, and a detection switch 62 operated by the detection piece 61.

The detection piece 61 is formed integrally with the supporting base 21 by projecting a part of the supporting base 21 on the bottom side of the supporting base in the direction substantially orthogonal to the direction of the movement of the optical pickup section 11.

Figure 19:
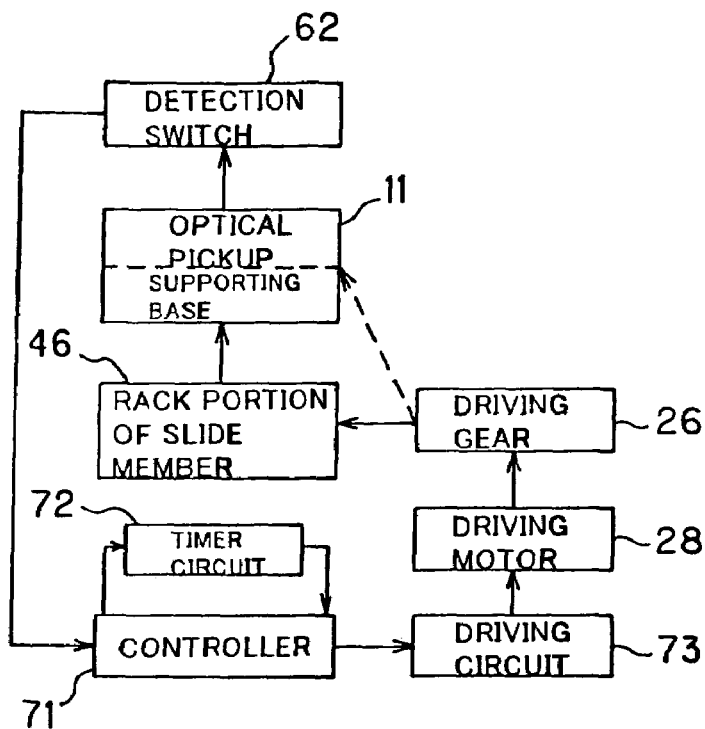
FIG. 19 is a flowchart for explaining the outline of the opening/closing operation of the opening/closing plate.

The detection switch 62 is provided on a circuit board, not shown, mounted on the chassis 13. More precisely, the detection switch 62 is arranged at a position such that it is abutted against the detection piece 61 when the objective lens 14 of the optical pickup section 11 on the circuit board, not shown, is moved substantially to the center in the radial direction of the TOC area of the optical disc. As will be described later, on the circuit board, not shown, there is provided a controller 71 having a timer circuit 72 for moving the optical pickup section 11 for a predetermined time period after the optical pickup section 11 is detected by the detection switch 62 as shown in FIG. 19. A driving circuit 73 for the driving motor 28 is also provided on the circuit board.

The driving motor 28 is driven for a predetermined time period by the timer circuit 72 of the controller 71, and thus moves the slide member 24 by a predetermined quantity with respect to the rack portion 33 of the supporting base 21, thereby moving the opening/closing plate 58 to the closing position for closing the aperture 20 of the cover member 18.

The disc rotational driving mechanism 2 has a disc table 65 on which the optical disc is set, and a spindle motor (not shown) for rotationally driving the disc table 65, as shown in FIG. 6. The spindle motor, not shown, is fixed to the chassis 13 and is drive-controlled by the driving circuit provided on the above-described circuit board, not shown, so that the optical disc rotates at a constant linear velocity.

The opening/closing operation of the opening/closing plate 58 accompanied by the movement of the optical pickup section 11, in the optical pickup device 1 of the disc drive device constituted as described above, will now be described with reference to the drawings.

Figure 15:
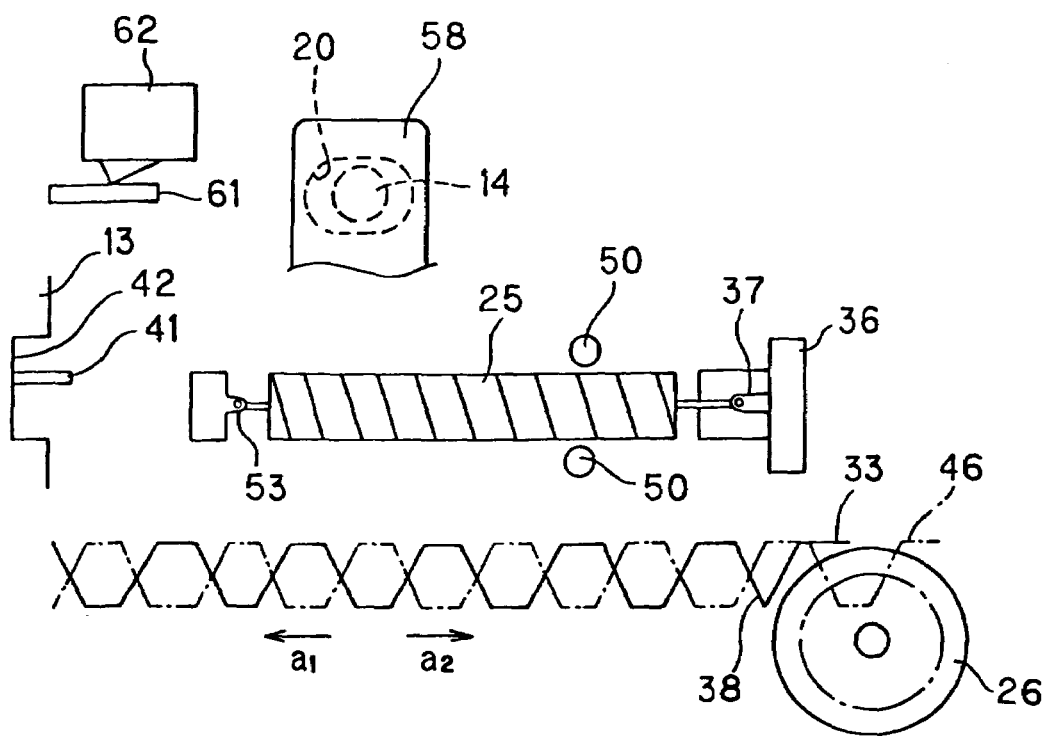
FIG. 15 is schematic view for explaining the state in which an opening/closing plate of the optical pickup device is moved to a closing position.

First, in the optical pickup device 1 in the standby state, the optical pickup section 11 is situated on the inner circle side of the TOC area of the optical disc. As shown in FIG. 15, the aperture 20 of the cover member 18 is closed by the opening/closing plate 58 and the facing surface of the objective lens 14 to the optical disc is thus covered by the opening/closing plate 58. Therefore, in the optical pickup device 1 in the standby state, attachment of dust and particles to the facing surface of the objective lens 14 to the optical disc is prevented by the opening/closing plate 58. In the optical pickup device 1 in this standby state, the meshing state between the rack portion 33 of the supporting base 21 and the driving gear 26 is canceled and the rack portion 46 of the slide member 24 having the opening/closing plate 58 provided thereon is meshed with the driving gear 26, as shown in FIG. 15. Hereinafter, this state is called state $S_4$.

Figure 16:
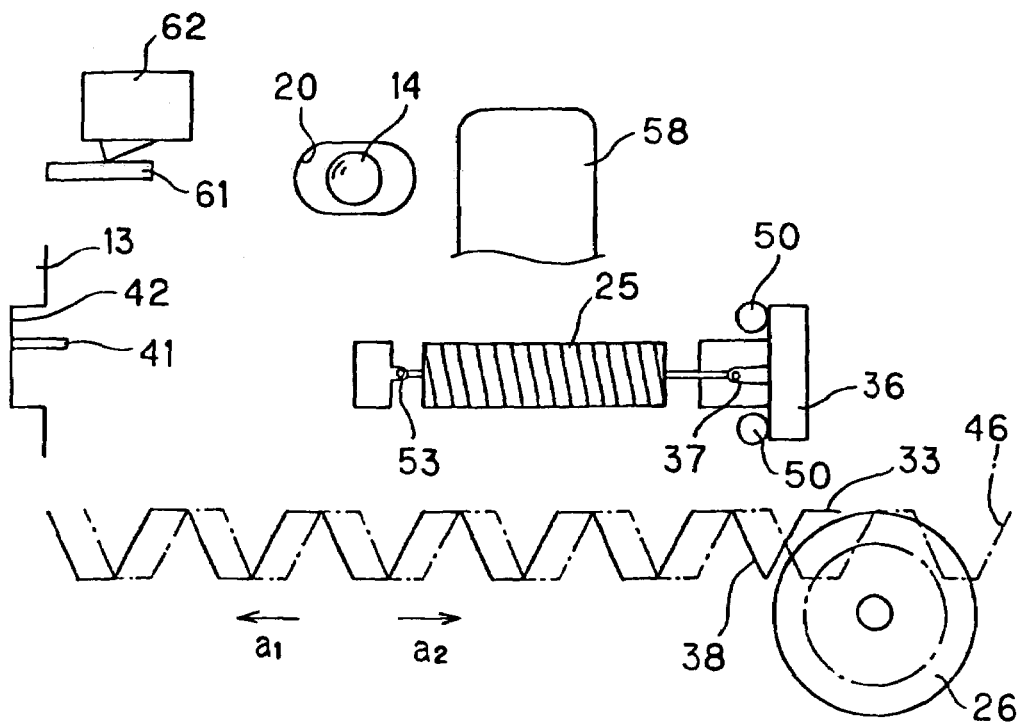
FIG. 16 is a schematic view for explaining the state in which the opening/closing plate is moved to an opening position.

Next, in the optical pickup device 1, when reproduction of the optical disc is started, the motor 28 is driven on the basis of a driving signal from the driving circuit section 73 controlled by the controller 71 and the driving gear 26 is thus driven, as shown in FIG. 16. The slide member 24 having the rack portion 46 meshed with the driving gear 26 is moved in the direction of the arrow a2 by the driving gear 26. As a result, the opening/closing plate 58 is moved in the direction of the arrow a2 to the opening position for opening the aperture 20 of the cover member 18 and for exposing the facing surface of the objective lens 14 to the optical disc. As shown in FIG. 16, in the optical pickup device 1, as the slide member 24 is moved in the direction of the arrow a2 by the driving gear 26, the regulating pins 50, 50 of the slide member 24 are abutted against the engagement pawl 36 of the rack portion 33 of the supporting base 21. Hereinafter, this state is called state $S_3$.

Figure 17:
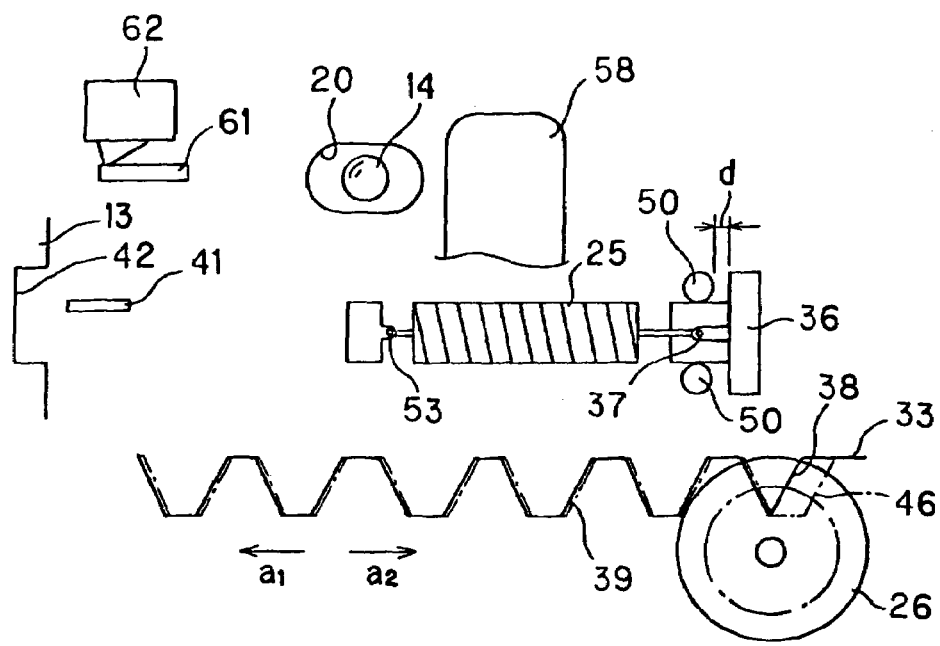
FIG. 17 is a schematic view for explaining the state in which an objective lens of the optical pickup device is moved to a TOC area of an optical disc.

In the optical pickup device 1, as the regulating pins 50, 50 are abutted against the engagement pawl 36, the energizing force of the tension coil spring 25 acts on the supporting base 21 and the supporting base 21 is moved in the direction of the arrow a2. Therefore, in the optical pickup device 1, the rack portion 33 of the supporting base 21 is meshed with the driving gear 26, and the cogs of the rack portion 33 of the supporting base 21 and the cogs of the rack portion 46 of the slide member 24 become coincident with each other and meshed with the driving gear 26, as shown in FIG. 17. In this case, the supporting base 21 is displaced by a small distance d in the direction of the arrow a2 because of the meshing of the rack portion 33 with the driving gear 26. Therefore, in the moving mechanism 12, the engagement pawl 36 is moved away by the small distance d from the regulating pins 50, 50, along with the displacement of the supporting base 21 by the small distance d in the direction of the arrow a2, as shown in FIG. 17. In the moving mechanism 12, since the regulating pins 50, 50 and the engagement pawl 36 are brought away from each other, the energizing force of the tension coil spring 25 acts to offset the backlash of the rack portion 33 of the supporting base 21 and the rack portion 46 of the slide member 24 with respect to the driving gear 26, as shown in FIG. 17. Hereinafter, this state is called state $S_2$.

Figure 18:
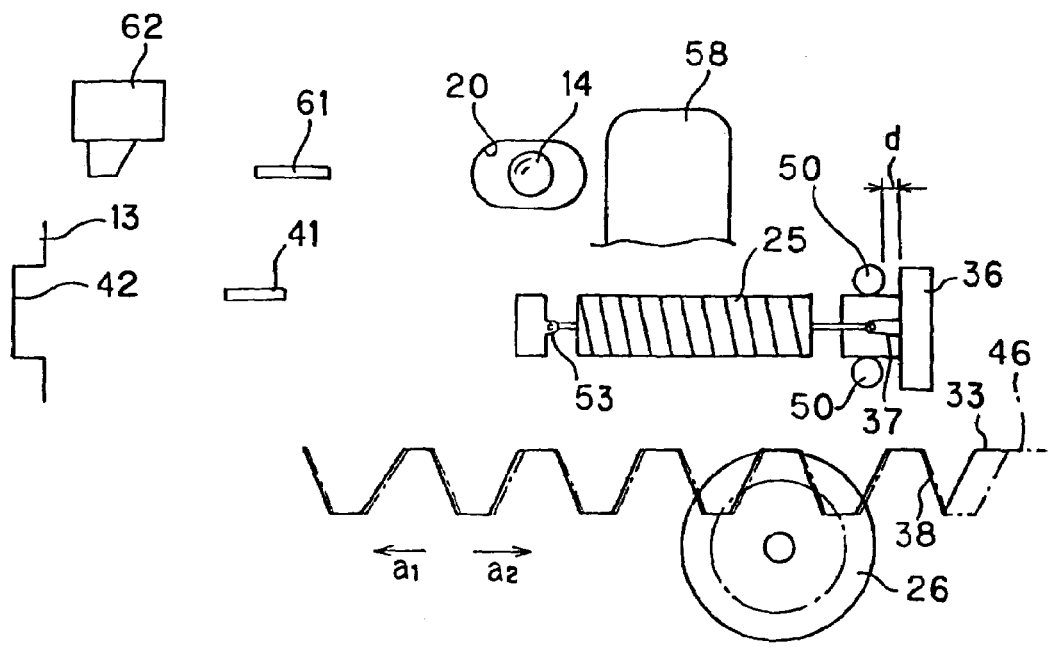
FIG. 18 is a schematic view for explaining the state in which the objective lens of the optical pickup device is moved to a recording area of the optical disc.

In the optical pickup device 1, as shown in FIG. 18, since the backlash is offset by the energizing force of the tension coil spring 25 in the reproducing state in which the optical pickup section 11 is reading out information from the recording area of the optical disc, the moving mechanism 12 can precisely move the optical pickup section 11 in the directions of the arrows a1 and a2 and information recorded on the optical disc can be satisfactorily read out by the optical pickup section 11. Hereinafter, this state is called state $S_1$.

When the stop of reproduction of the optical disc is set by operating a stop button, not shown, of the drive device, the optical pickup section 11 of the optical pickup device 1 is moved in the direction of the arrow a1 toward the inner circle side of the optical disc under the control of the controller 71, as shown in FIG. 17. If the optical pickup section 11 is moved into the TOC area of the optical disc or to a position on the inner side than the TOC area, the detection piece 61 of the supporting base 21 is abutted against the detection switch 62, thus operating the detection switch 62. The detection switch 62 is set in the ON-state and it is detected that the optical pickup section 11 is moved into the TOC area or to a position on the inner side than the TOC area.

When the detection switch 62 is set in the ON-state as shown in FIG. 17, a detection signal from the detection switch 62 is supplied to the controller 71, as shown in FIG. 19. This controller 71 controls the driving circuit 73 so that the driving circuit 73 outputs a driving signal for rotationally driving the driving motor 28, by a predetermined time period timed by the timer circuit 72. That is, the moving mechanism 12 moves the optical pickup section 11 in the direction of the arrow a1 by using the driving motor 28, by a time period preset by the timer circuit 72, as shown in FIG. 21.

Figure 20:
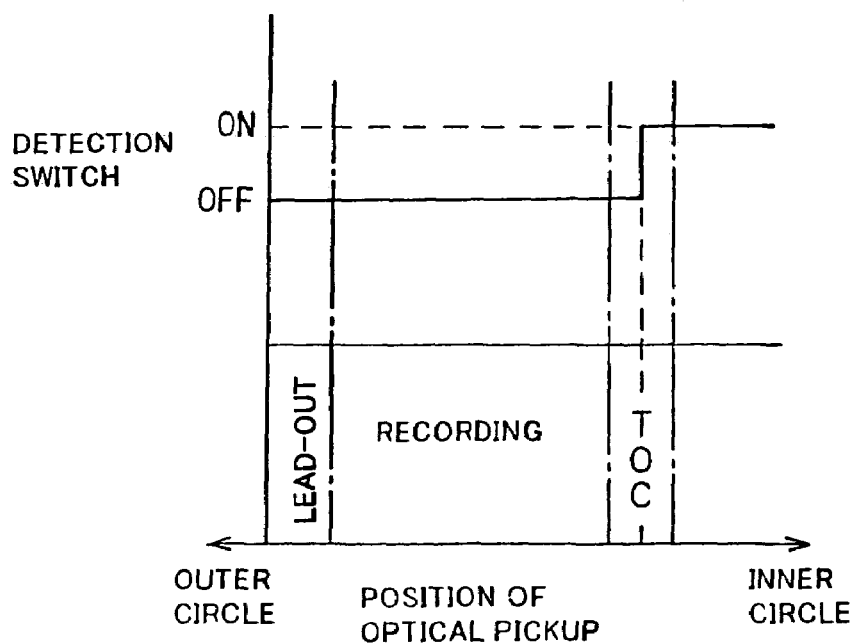
FIG. 20 is a view for explaining the operation timing of a detection switch provided in the optical pickup device.
Figure 21:
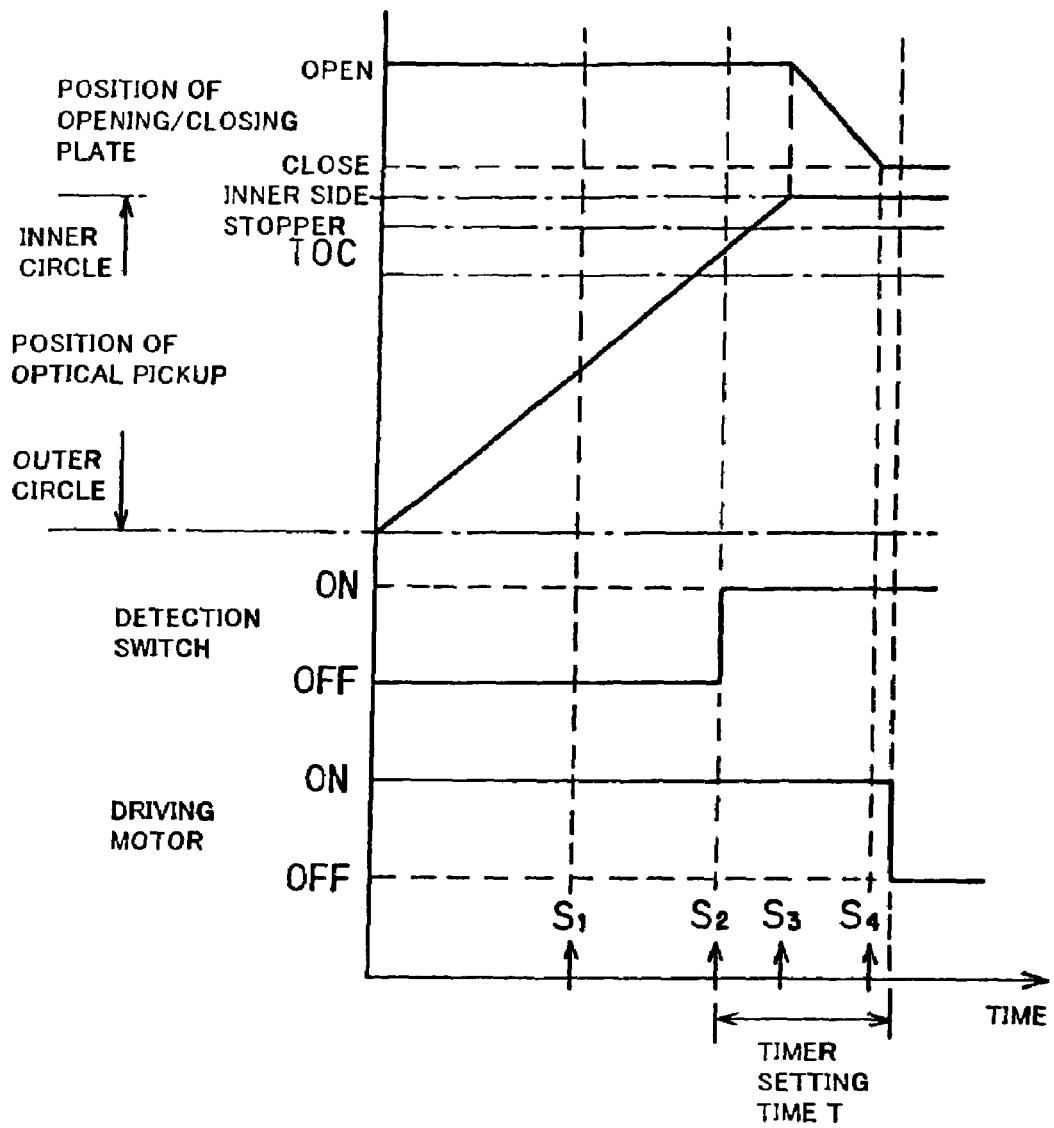
FIG. 21 is a view for explaining the relation between the opening/closing operation of the opening/closing plate and the position of the optical pickup.

The detection switch 62 is operated and set in the ON-state by the detection piece 61 of the supporting base 21 when the optical pickup section 11 is situated substantially at the center of the TOC area of the optical disc, as shown in FIGS. 20 and 21.

As shown in FIGS. 16 and 21, when the optical pickup section 11 is moved further in the direction of the arrow a1 and the optical pickup device 1 is in the state $S_3$ shown in FIG. 16, the inner-side stopper piece 41 of the supporting base 21 is abutted against the regulating recess portion 42 and the movement of the supporting base 21 is regulated, thus stopping the movement of the optical pickup section 11. As shown in FIGS. 16 and 19, in the moving mechanism 12, since the movement of the supporting base 21 is regulated, the cog 38 of the rack portion 33 of the supporting base 21 is detached from the driving gear 26 and the meshing state of the rack portion 33 with the driving gear 26 is canceled.

In the optical pickup device 1, as shown in FIGS. 15 and 21, the driving motor 28 is driven by a predetermined time period preset by the timer circuit 72 after the movement of the supporting base 21 is regulated. As a result, only the slide member 24 is moved in the direction of the arrow a1 by the driving gear 26 against the elastic force of the tension coil spring 25. Therefore, in the moving mechanism 12, as shown in FIGS. 15 and 21, the slide member 24 is moved in the direction of the arrow a1 relatively to the supporting base 21, and the opening/closing plate 58 provided on the slide member 24 is moved in the direction of the arrow a1 to the closing position for closing the aperture 20 of the cover member 18 and for covering the facing surface of the objective lens 14 of the optical pickup section 11 to the optical disc.

As is described above, in the optical pickup device 1 according to the present invention, since the opening/closing plate 58 is securely situated at the opening position for opening the aperture 20 when the objective lens 14 of the optical pickup section 11 is situated in the TOC area of the optical disc, TOC data recorded in the TOC area of the optical disc can be read out satisfactorily.

As is described above, in the optical pickup device 1 provided in the disc drive device, since the opening/closing operation of the opening/closing plate 58 is not affected by the lever ratio as in the conventional opening/closing mechanism, it is possible to precisely control the operation for opening/closing the aperture 20 by the opening/closing plate 58. Thus, it is possible to improve the reliability of the opening/closing operation and to precisely control the operation.

Therefore, with the optical pickup device 1 according to the present invention, since the aperture 20 of the cover member 18 can be securely closed by the opening/closing plate 58, attachment of dust and particles to the objective lens 14 can be prevented satisfactorily.

In the optical pickup device 1 provided in the disc drive device, since the energizing force of the tension coil spring 25 is used for offsetting the backlash and for energizing the opening/closing plate 58 in the opening direction, the rotary shaft 147 and the tension coil spring 148 of the above-described conventional opening/closing mechanism 145 are not necessary. Therefore, the number of components is reduced and the structure is simplified, thus enabling reduction in manufacturing cost.

As the structure is simplified, the assembly work for the disc drive device and the optical pickup device can be simplified. Therefore, improvement in workability, reduction in assembly failure and improvement in yield can be realized.

Although the above-described disc drive device is constituted to reproduce information from an optical disc, the disc drive device may also be constituted to record information to a write-once type optical disc which enables additional writing of information or a rewritable optical disc to which information can be rewritten. As a matter of course, the disc drive device may also be constituted to record/reproduce information to/from other optical discs such as a magneto-optical disc or the like, by providing a magnetic head mechanism for recording information at a position facing the optical pickup device.

INDUSTRIAL APPLICABILITY

As is described above, with the optical pickup device according to the present invention and the recording and/or reproducing device using this optical pickup device, it is possible to improve the reliability of the opening/closing operation of the opening/closing member and to securely prevent attachment of dust and particles to the facing surface of the objective lens. Moreover, with the optical pickup device and the recording and/or reproducing device, simplification of the overall structure and reduction in manufacturing cost can be realized.

What is claimed is:
1. A recording and/or reproducing device comprising:
   an optical pickup having an objective lens and provided to be movable in a radial direction of an optical disc;
   a guide portion for guiding the movement of the optical pickup in the radial direction of the optical disc, the guide portion includes a supporting shaft for guiding the optical pickup,
   a reference portion abutted at least two positions of an outer circumferential portion of the supporting shaft for positioning the supporting shaft, an engagement portion engaged with an outer circumferential portion of the supporting shaft, an elastic displacement portion formed integrally with the engagement portion for energizing the engagement portion in a radial direction of the supporting shaft, wherein the elastic displacement portion is bent from a direction substantially parallel to an axial direction of the supporting shaft to a direction substantially orthogonal to the axial direction of the supporting shaft thereby energizing the engagement portion in the radial direction of the supporting shaft;

a first rack portion provided on the optical pickup;

a slide member having an opening/closing portion for opening/closing a facing surface of the objective lens to the optical disc, and a second rack portion provided to be slidable on the first rack portion; and a driving mechanism having a driving gear which meshes with the first rack portion and the second rack portion;

wherein when the first and second rack portions are driven by the driving gear and the optical pickup is thus moved to and has reached a predetermined position on an inner circle side of the optical disc, the meshing state of the first rack portion with the driving gear is canceled and the second rack portion is driven by the driving gear to move the slide member, thereby moving the opening/closing portion from a position for opening the facing surface side of the objective lens to a position for closing the facing surface side, and further comprising a regulating portion to which the optical pickup moved toward an inner-circle of the optical disc is abutted and which is adapted for regulating the movement of the optical pickup.

* * * * *